G. P. CLARK.
Roll for Wringing-Machines.

No. 202,992. Patented April 30, 1878.

WITNESSES.

INVENTOR.

UNITED STATES PATENT OFFICE.

GEORGE P. CLARK, OF WINDSOR LOCKS, CONNECTICUT.

IMPROVEMENT IN ROLLS FOR WRINGING-MACHINES.

Specification forming part of Letters Patent No. 202,992, dated April 30, 1878; application filed March 23, 1878.

*To all whom it may concern:*

Be it known that I, GEORGE P. CLARK, of Windsor Locks, in the county of Hartford and State of Connecticut, have invented certain new and useful Improvements in Rolls for Wringing-Machines; and I do hereby declare that the following specification, taken in connection with the drawings making a part of the same, is a full, clear, and exact description thereof.

The present invention is an improvement upon the roller for wringing-machines described in the Letters Patent granted to me July 4, 1876, and numbered 179,399. The roller hereinafter described is composed of a series of sections of rubber, which are arranged side by side upon a central shaft, and clamped together by pressure applied in opposite directions between metallic flanges bearing against the two end sections of rubber, substantially as in the case of the former invention referred to.

The improvement consists in having each section separately compressed and held between metallic disks, whereby the density of the roller is more uniform throughout, and its consequent capacity to better resist the abrasion and wear to which its surface will in use be subjected is very greatly increased over what it is practicable to accomplish when each section is placed upon the shaft without having been previously condensed, and the whole series of sections are compressed at the same time between the two end flanges of the roller.

Figure 1:
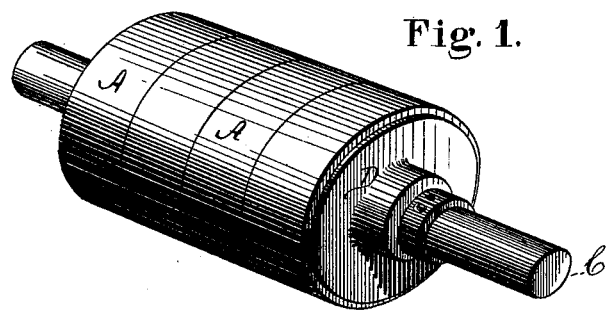
Figure 2:
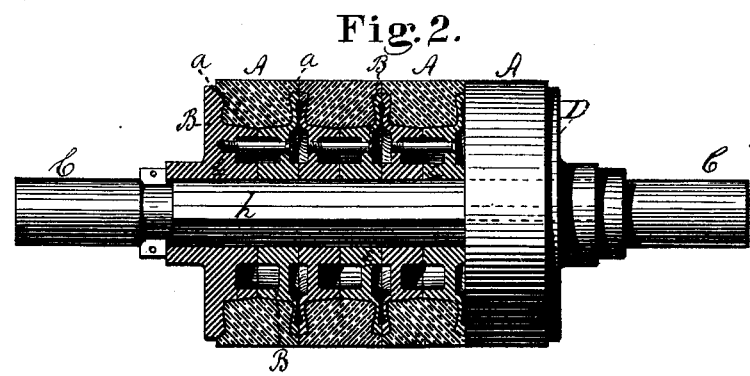
Figure 3:
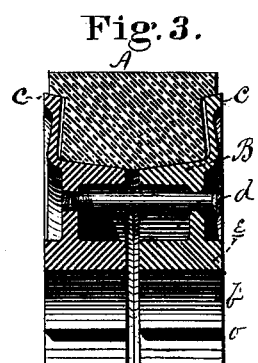
Figure 4:
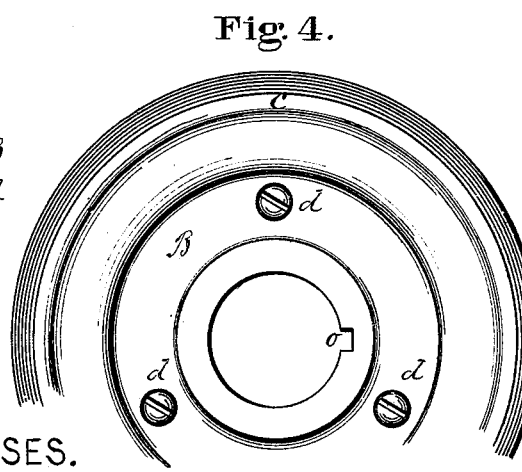
Figure 5:
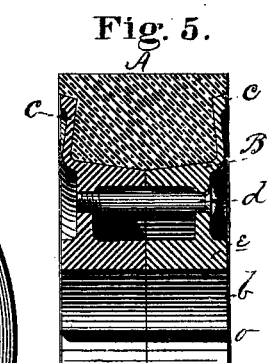

Referring to the drawings, Figure 1 is a view, in perspective, of the complete roller. Fig. 2 is partly a longitudinal section. Figs. 3 and 5 are sectional views of a section of rubber composing the roll and the metallic diskplates which compress the same, the figures, respectively, showing the rubber section before and after it is compressed by the disks. Fig. 4 is a front view of one of the disks.

A in the several figures represents an annulus of rubber or other material suitable for a roll of this class, the faces of which are formed with a recess, when molded, substantially as shown at $a$. B B are metallic disks, whose exterior faces are formed substantially as shown at Fig. 4. They have a central hole, $b$, to fit the shaft C, and are furnished with radial flanges $c$, whose inner faces correspond in form with the recesses $a$ in the faces of the rubber rings A. These metallic disks are arranged in pairs, as shown at Fig. 2, so as to form, in connection with suitable screw-bolts $d$, connecting the same, a clamp to hold and compress the rubber annulus. The thickness of each annulus should be so great, as compared with the aggregate length of the hub portions $e$ of the disks, that when a pair of fellow disks are applied to its faces, as shown at Fig. 3, the inner faces of the hubs will not meet by a space which will represent the extent to which the rubber will be condensed upon turning the screw-bolts so as to bring their hubs into contact, as shown at Fig. 5.

Each section of the roll, when ready to be arranged upon the central roller-shaft C, will be composed of a rubber annulus compressed between two metallic disks, whose radial flanges, with the exception of the two at the extreme ends of the roller, are embedded in the sides of the annulus, and whose hubs furnish a central support for the rubber. The several sections, so prepared, which are to compose the roller, are then to be mounted upon a common shaft, and are prevented from turning thereon by means of a spline or feather, $h$, which fills a suitable key-seat, $o$, cut in the hub portion of each disk and in the shaft C. The whole series of sections are also clamped together by means of a screw-collar, D, or any other suitable device—as, for instance, a key through the shaft, which will force the whole series of sections against a shoulder on the shaft, and hold them face to face in close contact, so as to exclude the admission of water into the joints formed by the abutting sections. The portions of the disks which come into contact should be turned off or brought to a true face.

As the roller described is more particularly intended for use in large power-driven machines employed in bleacheries and die-works, it is necessary that its density should be as uniform as possible. By the construction described this result can be easily accomplished, and also, by making the rubber rings of greater or less thickness relatively to the length of the hub portions of the fellow-disks which are to clamp them, the desired degree of density for different requirements can be obtained.

What I claim as my invention, and desire to secure by Letters Patent, is—

1. A roller for wringing-machines composed of sectional rings combined with a central shaft, each section consisting of a ring of rubber or equivalent suitable material, provided with and compressed between independent metallic clamps, substantially as described.

2. A roller for wringing-machines composed of sectional rings, each section consisting of rubber or equivalent elastic material supported centrally upon a metallic hub, and provided with and compressed laterally between independent metallic clamps, the whole series of sectional rings being combined with each other and their common shaft, substantially as described.

GEORGE PAYSON CLARK.

Witnesses:
D. J. OSBORNE,
J. L. ANDERSON.